(12) United States Patent
Aburame et al.

(10) Patent No.: US 11,535,311 B2
(45) Date of Patent: Dec. 27, 2022

(54) VEHICLE STRUCTURE

(71) Applicant: MAZDA MOTOR CORPORATION, Hiroshima (JP)

(72) Inventors: Masafumi Aburame, Aki-gun (JP); Shinji Miyamoto, Aki-gun (JP); Ichiro Sakai, Aki-gun (JP); Yohei Kusamoto, Aki-gun (JP); Masaki Hirata, Aki-gun (JP); Kosuke Hirayama, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 194 days.

(21) Appl. No.: 17/017,826

(22) Filed: Sep. 11, 2020

(65) Prior Publication Data

US 2021/0086844 A1    Mar. 25, 2021

(30) Foreign Application Priority Data

Sep. 20, 2019  (JP) .............................. JP2019-171973

(51) Int. Cl.
*B60Q 1/26*      (2006.01)
*B62D 35/00*   (2006.01)
*B60Q 1/30*      (2006.01)

(52) U.S. Cl.
CPC ........... *B62D 35/00* (2013.01); *B60Q 1/2619* (2013.01); *B60Q 1/30* (2013.01)

(58) Field of Classification Search
CPC ... B60Q 1/0458; B60Q 1/0005; B60Q 1/2619
See application file for complete search history.

(56) References Cited

U.S. PATENT DOCUMENTS

| 2006/0002126 | A1* | 1/2006 | Koizumi | ................ | F21S 43/40 |
| | | | | | 362/509 |
| 2017/0259733 | A1* | 9/2017 | Son | ........................ | B60Q 1/324 |
| 2017/0274943 | A1* | 9/2017 | Nakamura | ........... | B62D 35/007 |

FOREIGN PATENT DOCUMENTS

JP          2017-087871 A      5/2017

* cited by examiner

*Primary Examiner* — William J Carter
(74) *Attorney, Agent, or Firm* — Studebaker & Brackett PC (57) ABSTRACT

A vehicle includes a rear lamp, a side surface, and a rear surface. The rear lamp is disposed on a rear end and an upper end of a lower side surface and a rear end and a side end of the vehicle, and includes a lamp body extending in a front-rear direction of the vehicle. The side surface includes the lower side surface bulging toward a vehicle-width-direction outer side with respect to the rear lamp at a front side of a height position overlapping with the rear lamp. The rear surface includes an extending surface extending toward the vehicle-width-direction outer side with respect to the lamp body in a top view of the vehicle from a lower portion of the lamp body. A side surface airflow is directed toward a vehicle-width-direction inner side through the extending surface and the generation of a large trailing vortex is suppressed.

12 Claims, 12 Drawing Sheets

VEHICLE STRUCTURE

TECHNICAL FIELD

The present disclosure relates to a structure of a vehicle including a vehicle side surface and a vehicle rear surface having a rear lamp such as a four-wheeled passenger car.

BACKGROUND ART

In a vehicle such as a four-wheeled passenger car, the reduction of the traveling resistance (aerodynamic resistance) is vital in order to improve the traveling performance and the fuel efficiency of the vehicle. In order to reduce the traveling resistance, means for mounting a rear spoiler on a vehicle rear portion is generally used. Japanese Patent Laid-Open No. 2017-87871 discloses a technology of reducing the traveling resistance by disposing a side spoiler including a ridgeline portion that separates an airflow (hereinafter referred to as a side surface airflow) flowing along a vehicle side surface on a vehicle rear portion.

SUMMARY

According to the research of the inventors of the present disclosure, it has been found that a trailing vortex flowing such that an airflow extends in a spiral manner is formed behind a vehicle that is traveling and the trailing vortex affects the traveling resistance of the vehicle. It also has been found that the traveling resistance increases as the size of the trailing vortex increases or the trailing vortex is a stronger vortex. Therefore, the traveling resistance is required to be reduced by making the trailing vortex smaller (weaker) as much as possible.

Accordingly, the present disclosure provides a vehicle body structure capable of reducing traveling resistance due to a trailing vortex.

A vehicle body structure according to an aspect of the present disclosure is a vehicle structure, including a rear lamp disposed on a rear end and a side end of a vehicle and including a lamp body extending in a front-rear direction of the vehicle; a vehicle side surface including a portion bulging toward a vehicle-width-direction outer side with respect to the rear lamp at a front side of a height position overlapping with the rear lamp; and a vehicle rear surface including an extending surface extending toward the vehicle-width-direction outer side with respect to the lamp body in a top view of the vehicle from a lower portion of the rear lamp.

According to this vehicle body structure, the side surface airflow flowing along the vehicle side surface bulging out to a place on the outer side of the rear lamp enters the side of the lower portion of the rear lamp so as to be along the extending surface in the vehicle rear surface. The side surface airflow is directed toward a vehicle-width-direction inner side on the vehicle rear side through the extending surface. The inflow of the side surface airflow toward the vehicle-width-direction inner side inhibits the generation of a large and strong trailing vortex. In other words, by using the inflow of the side surface airflow as an opportunity, trailing vortices are generated above and below the side surface airflow. As a result, subdivided trailing vortices are generated, and the generation of a large trailing vortex that increases the traveling resistance is suppressed.

The abovementioned vehicle structure preferably includes a recessed portion provided on a lower portion of the rear lamp, partitioned by the extending surface and a side surface of the lamp body, and extending downward on the vehicle-width-direction inner side toward a lower surface of the lamp body from a side surface of the lamp body on the vehicle-width-direction outer side.

The recessed portion is shaped as if being cut toward the vehicle-width-direction inner side below the rear lamp. Therefore, according to the vehicle body structure, the side surface airflow can be even more easily directed toward the vehicle-width-direction inner side in such a manner that the side surface airflow is guided by the recessed portion.

In the abovementioned vehicle structure, a side surface of the lamp body on the vehicle-width-direction outer side is preferably formed by a cylindrical-shaped portion extending in the front-rear direction of the vehicle.

According to this vehicle body structure, the side surface of the lamp body on the vehicle-width-direction outer side has a cylindrical shape, and hence a portion protruding to the vehicle-width-direction outer side and a portion recessed toward the inner side are exhibited in the vehicle height direction. Therefore, the section in which the lamp body is disposed can be a section that easily directs the side surface airflow toward the vehicle-width-direction inner side.

In the abovementioned vehicle structure, a side surface of the lamp body on the vehicle-width-direction outer side is preferably formed by a cylindrical-shaped portion extending in the front-rear direction of the vehicle, the extending surface preferably includes, at a place below the lamp body, a guide surface extending toward the vehicle-width-direction outer side from a lower end portion of the cylindrical-shaped portion, and the recessed portion is preferably partitioned by a lower curved portion of the cylindrical-shaped portion and the guide surface of the extending surface.

According to this vehicle structure, the recessed portion is formed by the lower curved portion of the cylindrical-shaped portion and the guide surface extending toward the vehicle-width-direction outer side from the lower end portion of the cylindrical-shaped portion. Therefore, a structure in which the side surface airflow enters the vehicle-width-direction inner side even more easily by being guided by the recessed portion can be obtained.

In the abovementioned vehicle structure, the vehicle side surface preferably includes an upper side surface above a beltline of the vehicle and a lower side surface below the beltline, the lower side surface preferably has a wider width than the upper side surface, and the rear lamp is preferably disposed on a rear end and an upper end of the lower side surface.

According to this vehicle structure, the vehicle width switches from the lower side surface of which width is relatively wide to the upper side surface of which width is narrow at the beltline serving as a border. The rear lamp is disposed on the rear end and the upper end of the lower side surface serving as a vehicle-width switching portion from the wide width to the narrow width. Therefore, the side surface airflow easily enters the vehicle-width-direction inner side also at a place above the rear lamp, which contributes to the formation of the subdivided trailing vortices.

In this case, the lamp body is more preferably disposed on an extended line of the beltline in a plan view seen from a place above the vehicle. As a result, the side surface airflow flowing along the beltline can be caused to easily enter the vehicle-width-direction inner side.

In the abovementioned vehicle structure, the extending surface preferably has a surface shape that expands toward the vehicle-width-direction outer side and extends downward in a direction heading toward a rear-end side from a front-end side of the lamp body.

According to this vehicle structure, a larger amount of the side surface airflow can be taken into the extending surface from the vehicle-width-direction outer side of the lamp body and caused to enter the vehicle-width-direction inner side. Therefore, the subdivided trailing vortices can be formed in a more reliable manner.

In this case, the extending surface preferably extends to a place behind a rear end portion of the lamp body from a side of the lamp body on the vehicle-width-direction outer side. By this vehicle structure, the side surface airflow is guided to the extending surface and is caused to enter the vehicle-width-direction inner side more easily.

According to the present disclosure, the vehicle body structure of which traveling performance, fuel efficiency, and the like are improved by reducing the traveling resistance due to the trailing vortex can be provided.

DETAILED DESCRIPTION

[Overall Configuration of Vehicle]

Figure 1:
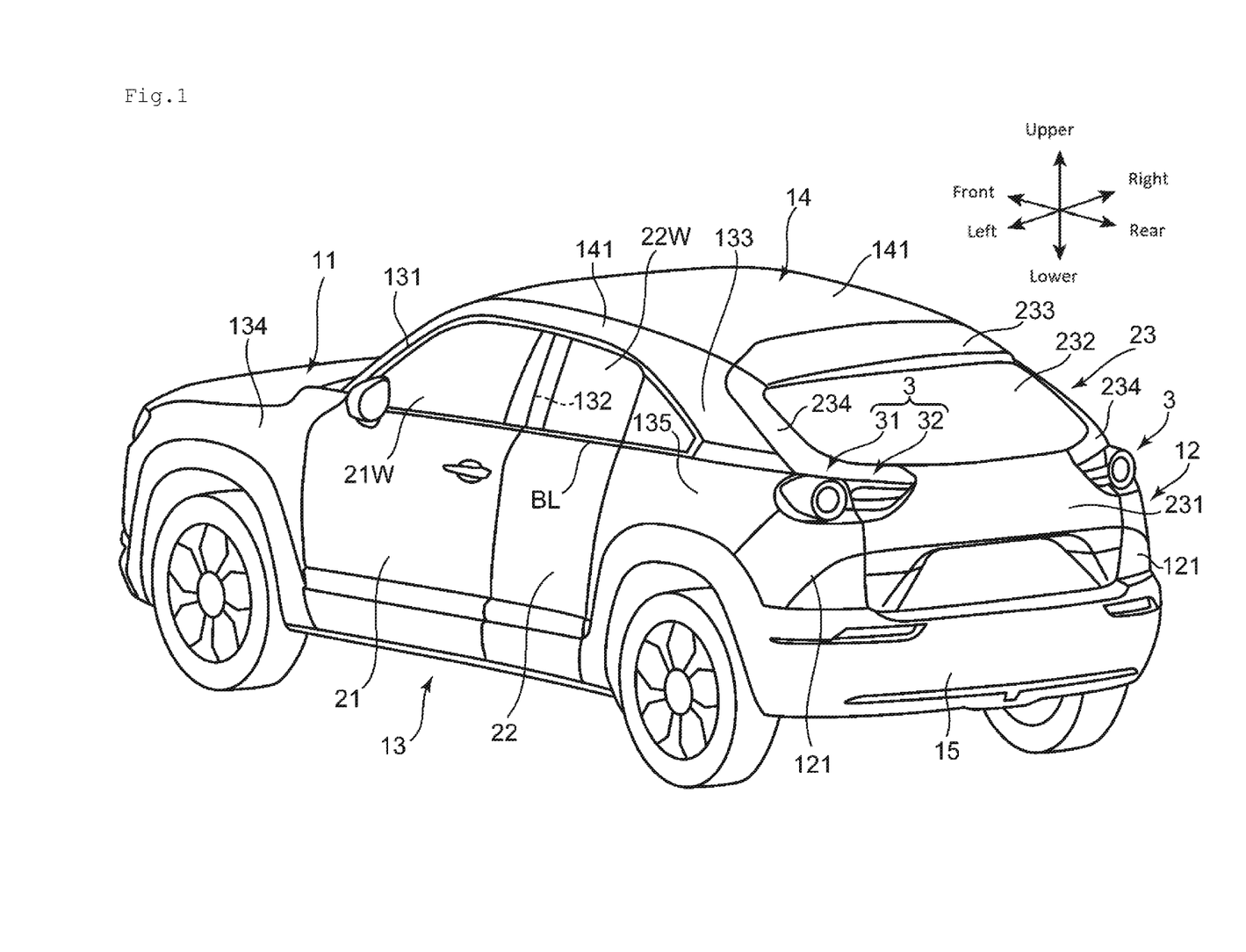
FIG. 1 is a perspective view of a vehicle according to an embodiment of a vehicle structure of the present disclosure.

An embodiment of the present disclosure is described in detail with reference to the drawings below. FIG. 1 is a perspective view of a vehicle V to which a vehicle structure of the present disclosure is applied. First, with reference to FIG. 1, the overall configuration of the vehicle V is described. The vehicle V of this embodiment is a four-door hatchback passenger car, and includes a front portion 11 forming the front-side portion of the vehicle V, a rear surface 12 (vehicle rear surface) forming each of a rear surface, a pair of side surfaces, and a top surface of the vehicle V, a pair of side surfaces 13 (vehicle side surfaces), and a top surface 14.

Each of the side surfaces 13 includes a front pillar 131, a center pillar 132, and a rear pillar 133 from the front side to the rear side. A front fender 134 is provided on the lower front side of the front pillar 131 in a continuous manner A rear fender 135 is provided on the lower rear side of the rear pillar 133 in a continuous manner A front door 21 including a front side window 21W is disposed between the front pillar 131 and the center pillar 132. A rear door 22 including a rear side window 22W is disposed between the center pillar 132 and the rear pillar 133.

The rear surface 12 includes a flip-up lift gate 23, rear side faces 121, a rear bumper 15, rear lamps 3, and extending surfaces 4. The lift gate 23 is pivotably mounted on a place around a rear end of the top surface 14, and pivots upward when a rear luggage compartment of the vehicle V is opened. The rear side faces 121 are disposed as a pair of left and right rear side faces such that a lower-side portion (outer panel 231) of the lift gate 23 is interposed therebetween. The rear side faces 121 are provided to be continuous with rear ends of the rear fenders 135. The rear bumper 15 is disposed below the lift gate 23 and the rear side faces 121. The rear lamps 3 are disposed on left and right side ends of the rear surface 12 positioned on a rear end of the vehicle V. The extending surfaces 4 extend from lower portions of the rear lamps 3 toward the vehicle-width-direction outer side. The rear lamps 3 and the extending surfaces 4 are described in detail below.

The top surface 14 includes roof rails 141 and a roof panel 142. The roof rails 141 are frames extending in the front-rear direction and are disposed as a pair of left and right roof rails. Front end portions and rear end portions of the pair of roof rails 141 are connected to each other by a front header and a rear header (not shown). The roof panel 142 covers a place between the pair of roof rails 141 from the upper side over the entire area.

Figure 2:
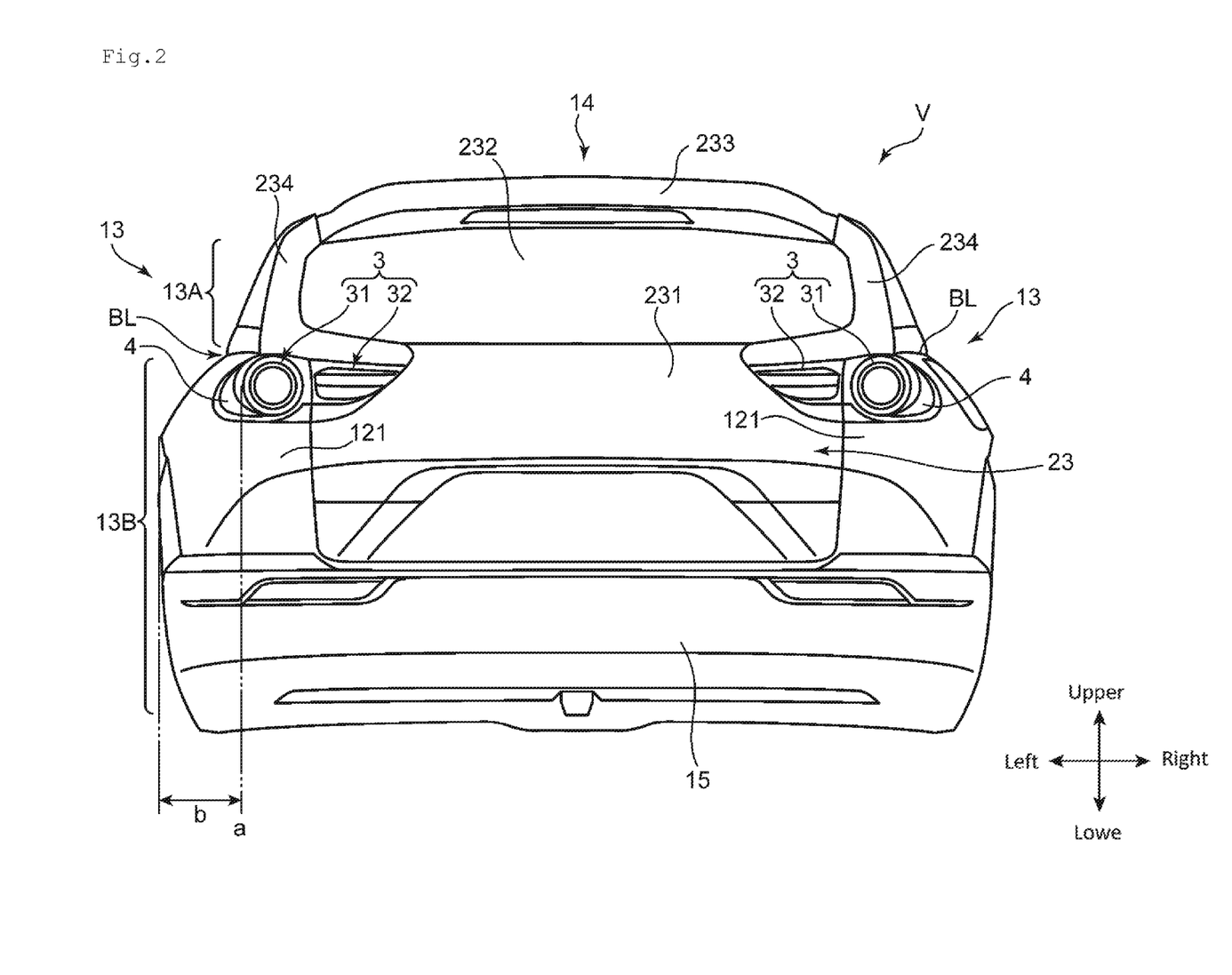
FIG. 2 is a rear view of the vehicle illustrated in FIG. 1.
Figure 3:
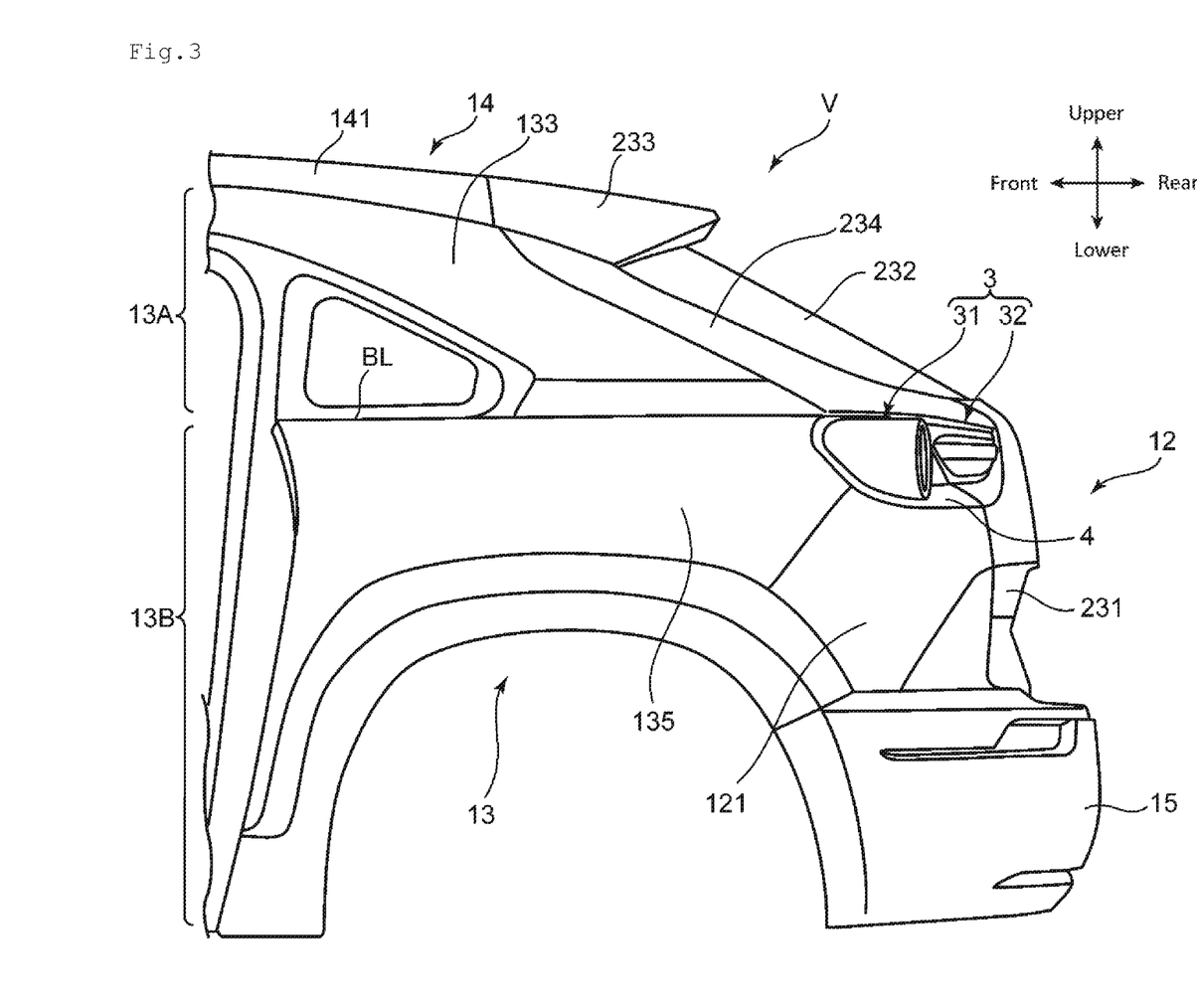
FIG. 3 is a side view of the rear side of the vehicle illustrated in FIG. 1.
Figure 4:
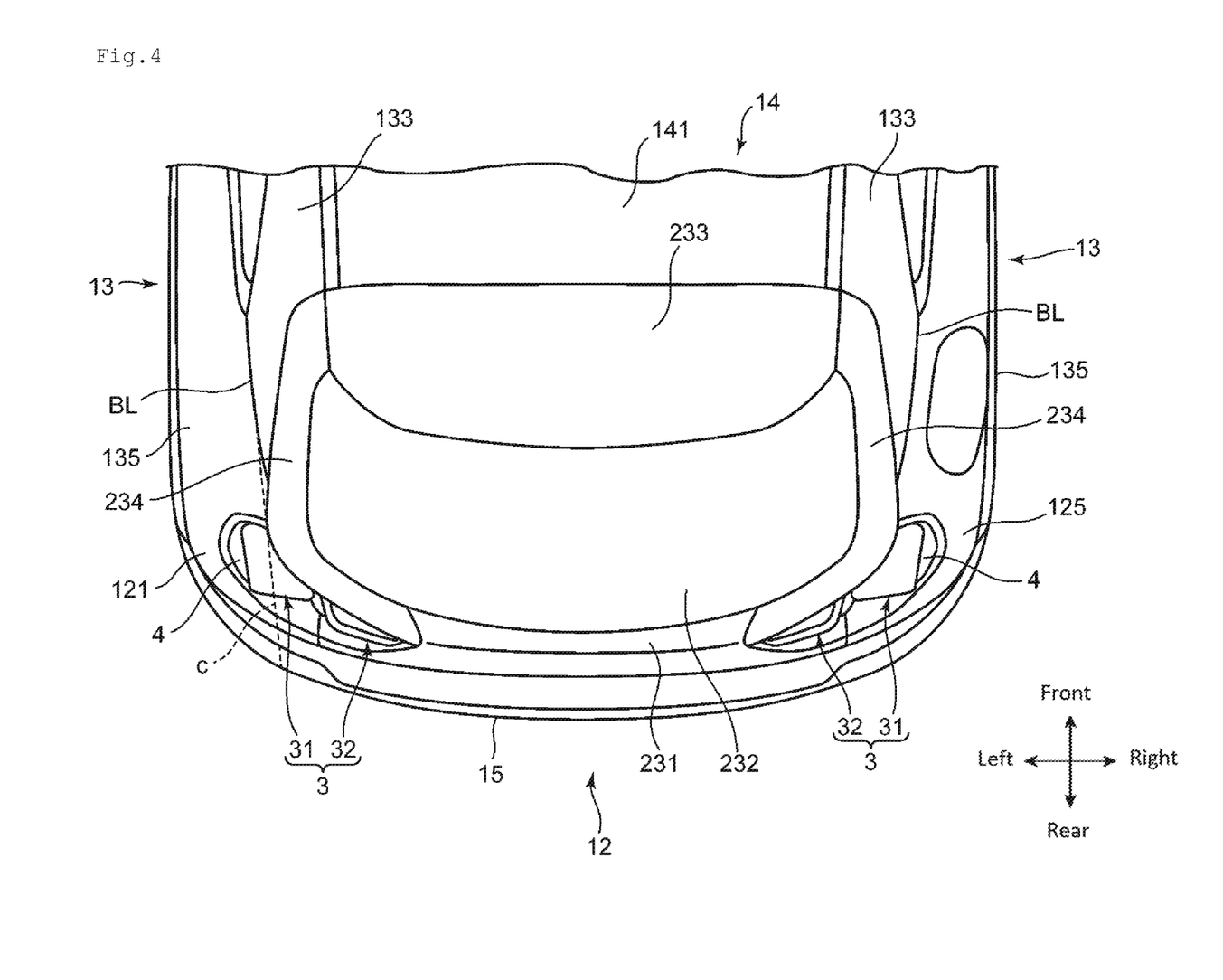
FIG. 4 is a top view of the rear side of the vehicle illustrated in FIG. 1.

Description is added for the rear surface 12 and the side surface 13 with reference to FIG. 2 to FIG. 4 in addition to FIG. 1. FIG. 2 is a rear view of the vehicle V illustrated in FIG. 1, and FIG. 3 and FIG. 4 are a side view and a top view of the rear side of the vehicle V. In the side surface 13, a beltline BL extends in the vehicle front-rear direction. The beltline BL is a line extending along lower ends of the front side window 21W and the rear side window 22W.

The lift gate 23 forming a part of the rear surface 12 includes the outer panel 231, a rear window 232, a rear spoiler 233, and a pair of left and right rear side garnishes 234. The outer panel 231 is a metal panel forming a place around a lower end of the lift gate 23. The outer panel 231 enters a place between the pair of left and right rear side faces 121 and a place between the pair of left and right rear lamps 3 in a state in which the lift gate 23 is closed. The rear window 232 is disposed above the outer panel 231. The rear spoiler 233 is mounted on the lift gate 23 so as to cover over a place around an upper end of the rear window 232. The pair of rear side garnishes 234 are mounted on left and right side surfaces of the rear window 232. Lower end portions of the rear side garnishes 234 enter the inner side at a place above the rear lamps 3 in the vehicle width direction (left-right direction) by a predetermined length.

Each of the side surfaces 13 includes an upper side surface 13A above the beltline BL, and a lower side surface 13B below the beltline BL. As it is clear from FIG. 2, the lower side surface 13B has a wider width than the upper side surface 13A in the left-right direction. The pair of left and right rear lamps 3 are disposed in positions that are substantially directly below the left and right beltlines BL in a rear view. In other words, the rear lamps 3 are disposed in places around the left and right upper ends and the rear ends of the lower side surfaces 13B. However, the lower side surface 13B includes a portion bulging toward the vehiclewidth-direction outer side with respect to the rear lamp 3 at the front side of a height position overlapping with the rear lamp 3. In other words, as illustrated in FIG. 2, for the lower side surface 13B on the left side, the lower side surface 13B includes a portion b bulging out to a place on the left side of a position a in which the rear lamp 3 (an outer light 31 described below) is disposed.

Each of the rear lamps 3 include the outer light 31 positioned on the vehicle-width-direction outer side, and an inner light 32 positioned on the vehicle-width-direction inner side. A brake light, a taillight, a direction indicator light, and an emergency flashing light, for example, are accommodated in the outer light 31. A brake light, a taillight, and a back-up light, for example, are accommodated in the inner light 32. The outer lights 31 are assembled on upper portions of the rear side faces 121. Meanwhile, the inner lights 32 are assembled on the lift gate 23 side so as to be positioned on places around both of left and right ends of the outer panel 231. As it is clear from FIG. 4, the outer lights 31 (lamp bodies 33 described below) are disposed on extended lines c of the beltlines BL in a plan view seen from a place above the vehicle V.

The extending surfaces 4 disposed on the rear surface 12 are provided in order to direct the side surface airflow (traveling air) flowing along the side surfaces 13 when the vehicle V travels toward the vehicle-width-direction inner side at the rear surface 12. Each of the extending surfaces 4 has a shape extending toward the vehicle-width-direction outer side with respect to the outer light 31 (lamp body 33) in a top view of the vehicle V from a lower portion of the rear lamp 3.

[Details of Rear Lamp]

Figure 5A:
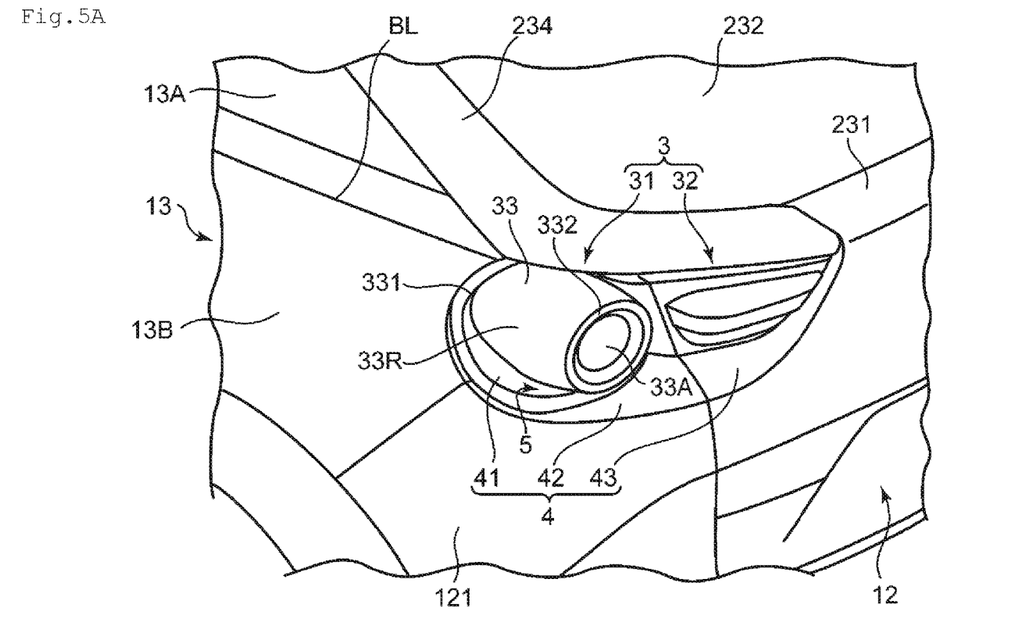
FIG. 5A is a perspective view in which a place around a left rear lamp in FIG. 1 is enlarged.
Figure 5B:
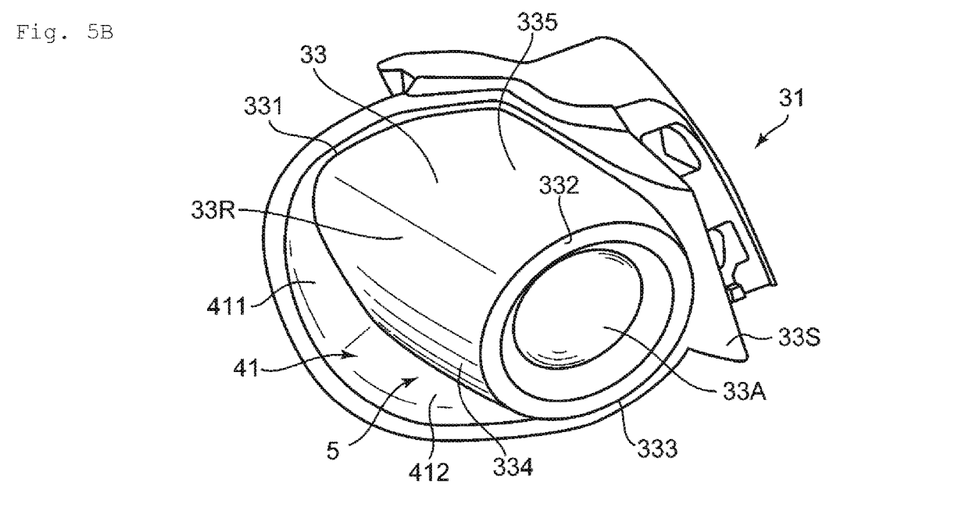
FIG. 5B is a perspective view of an outer light alone.
Figure 6:
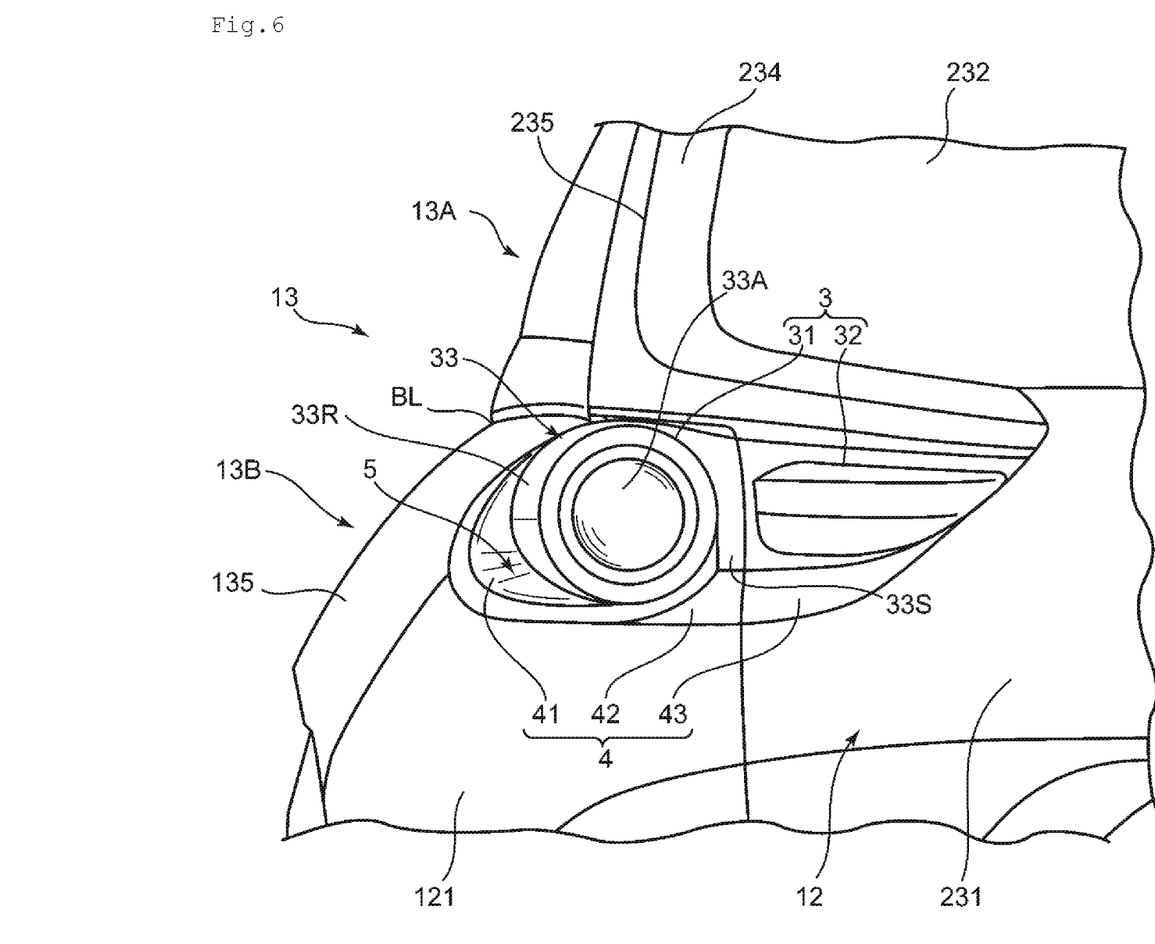
FIG. 6 is a rear view in which a place around the left rear lamp in FIG. 2 is enlarged.
Figure 7:
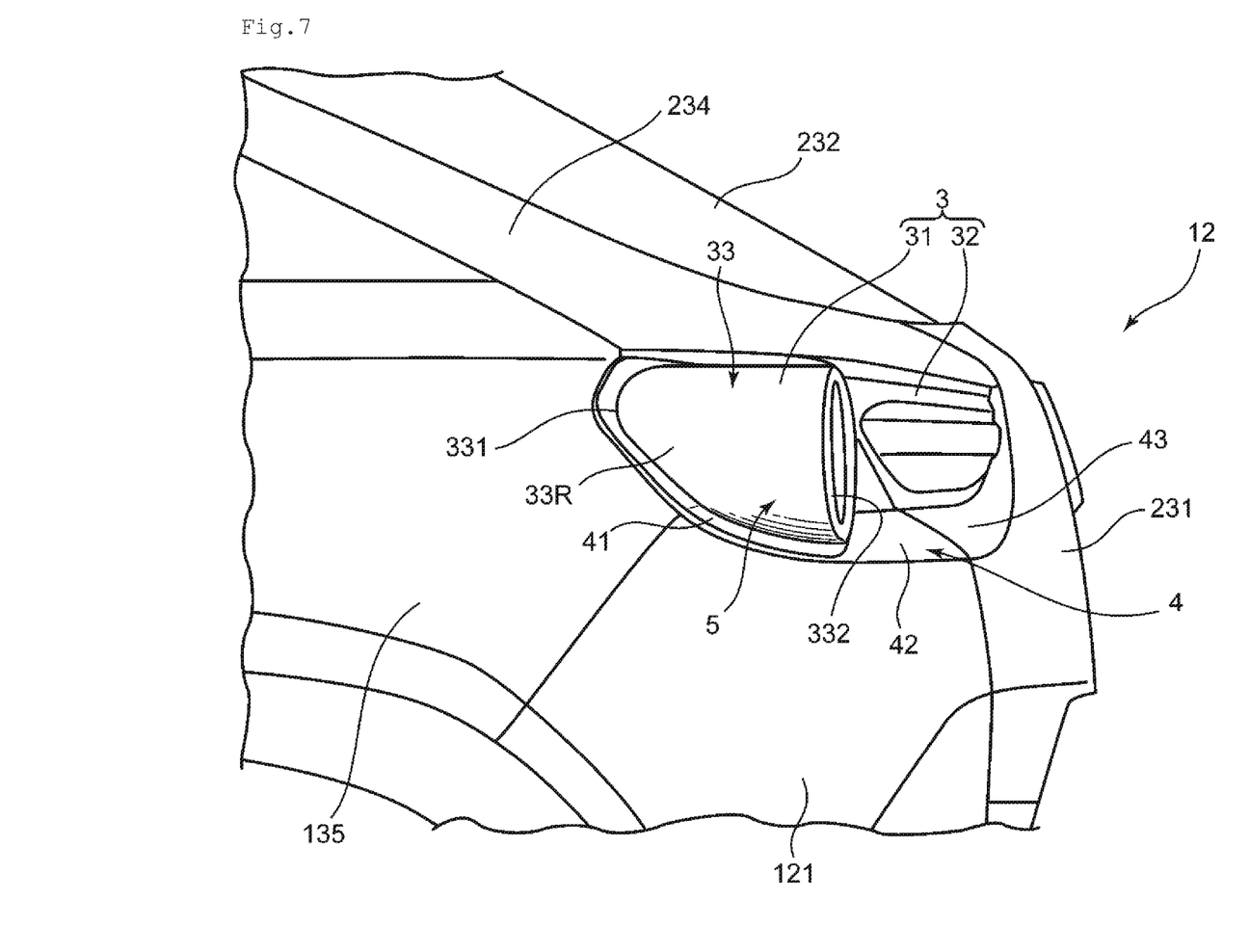
FIG. 7 is a side view in which a place around the left rear lamp in FIG. 3 is enlarged.
Figure 8:
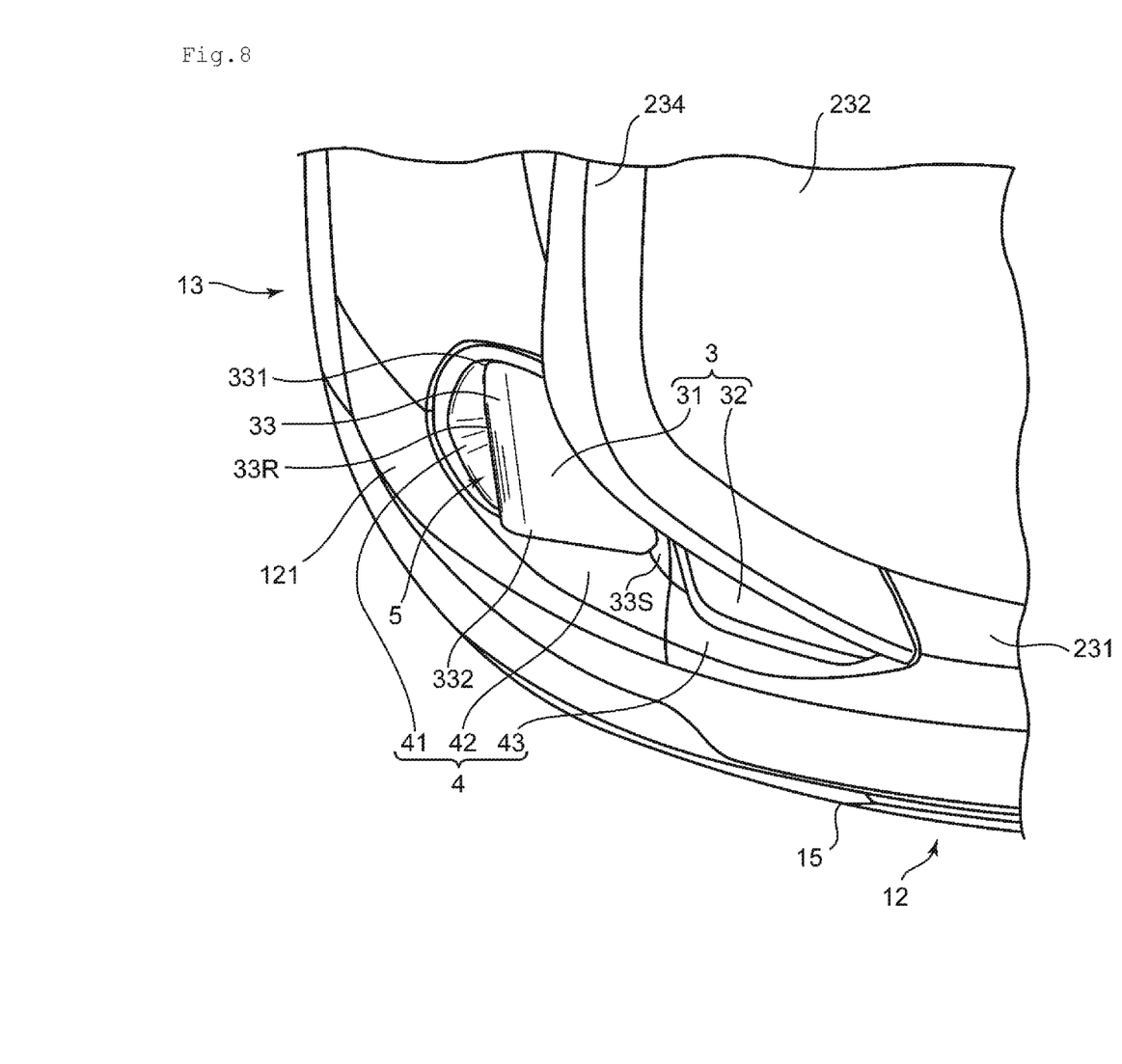
FIG. 8 is a top view in which a place around the left rear lamp in FIG. 4 is enlarged.

Next, the rear lamp 3 is described in detail with reference to FIG. 5A to FIG. 8. FIG. 5A is a perspective view in which a place around the left rear lamp 3 in FIG. 1 is enlarged, and FIG. 5B is a perspective view of the outer light 31 alone. FIG. 6, FIG. 7, and FIG. 8 are a rear view, a side view, and a top view in which the places around the left rear lamp 3 in FIG. 2, FIG. 3, and FIG. 4 are enlarged. The rear lamp 3 of this embodiment includes the outer light 31 and the inner light 32, but the shape of the outer light 31 disposed along the side surface 13 affects the formation of the trailing vortex. Therefore, the shape of the outer light 31 is described here.

The outer light 31 includes the lamp body 33 extending in the front-rear direction of the vehicle V. The position in which the lamp body 33 is disposed is the rear end and the side end of the vehicle V. In other words, in this embodiment, the lamp body 33 out of the rear lamp 3 is disposed in a place around the rear end and the upper end of the lower side surface 13B. The lamp body 33 has a cylindrical shape roughly extending in the front-rear direction. An axial core of the cylindrical shape roughly extends along an extended line c of the beltline BL.

A front end 331 of the lamp body 33 is provided to be continuous with a rear end of the rear fender 135. A rear end 332 of the lamp body 33 has a round shape in a rear view (FIG. 6) and extends to a place around an intermediate position of the front-rear width of the extending surface 4 in a side view (FIG. 7). In other words, the rear end 332 is in a position that is recessed to a place ahead of rearmost ends of the rear side face 121 and the outer panel 231 of the lift gate 23. A transparent cover 33A that is round in a rear view is fitted with the rear end 332.

On a side surface of the lamp body 33 on the vehicle-width-direction inner side, a spacer portion 33S that fills the gap between an outer edge of the inner light 32 and the side surface is integrally provided. Meanwhile, a side surface of the lamp body 33 on the vehicle-width-direction outer side is formed by a cylindrical-shaped portion 33R extending in the front-rear direction. As it is clear from FIG. 8, the cylindrical-shaped portion 33R has a tapered shape of which diameter reduces from the front end 331 toward the rear end 332. In other words, the cylindrical-shaped portion 33R has a shape of which rear side is inclined toward the vehicle-width-direction inner side. In this embodiment, the inclination angle thereof is about 10 degrees.

With reference to FIG. 5B, an outward protruding piece 41 is attached to the lamp body 33 in an integrally molded manner. The outward protruding piece 41 includes a portion extending toward the vehicle-width-direction outer side with respect to the cylindrical-shaped portion 33R that is an outer side surface of the lamp body 33. The outward protruding piece 41 includes a descending surface 411 and a guide surface 412. The descending surface 411 extends while descending from a place around an upper portion of the front end 331 of the lamp body 33 toward the rear side. The guide surface 412 extends toward the vehicle-width-direction outer side from a lower end 333 of the cylindrical-shaped portion 33R at a place below the lamp body 33 and is provided to be continuous with a lower end of the descending surface 411. A rear side edge of the guide surface 412 is positioned to be in a place slightly ahead of the rear end 332 of the lamp body 33.

[Details of Extending Surface]

With reference to FIG. 5A to FIG. 8, the extending surface 4 is described in detail. The extending surface 4 is formed by the outward protruding piece 41 that is integral with the lamp body 33 described above, a rear-side extending surface 42, and an inner-side extending surface 43. The rear-side extending surface 42 is a surface that is formed on an upper end of the rear side face 121 and extends from a place below a place around the rear end 332 of the lamp body 33 to the rear side (FIG. 8). The inner-side extending surface 43 is a surface that is formed in a place below the inner light 32 in the outer panel 231 and extends from an inner side edge of the rear-side extending surface 42 toward the vehicle-width-direction inner side.

The outward protruding piece 41 is portion extending to a place on the outer side of the lamp body 33 in the vehicle width direction in the extending surface 4. The outward protruding piece 41 extends downward in a direction toward the rear end 332 side from the front end 331 side of the lamp body 33 and has a surface shape that expands toward the vehicle-width-direction outer side. The surface shape is formed by the descending surface 411 and the guide surface 412 described above. The descending surface 411 has a narrow width around the front end 331, but the expansion thereof toward the outer side increases as the descending surface 411 approaches the rear side or descends. The descending surface 411 and the guide surface 412 form a curved surface convex to the lower side in a side view (FIG. 7) and form a bulging-out shape that is convex toward the vehicle-width-direction outer side in a top view (FIG. 8).

In this embodiment, an example in which a portion extending toward the vehicle-width-direction outer side is formed by the outward protruding piece 41 that is integral with the lamp body 33 is described. Instead of the above, a surface equivalent to the outward protruding piece 41 may be formed by a body of the vehicle body (for example, by an upper end of the rear side face 121). However, it is difficult to assemble the cylindrical lamp body 33 and the body of the vehicle body together by causing the cylindrical lamp body 33 and the body of the vehicle body to be in abutment with each other, and a gap is easily generated between the two. In this case, not only does the assembling stability of the lamp body 33 decrease, but the traveling air may enter the gap, thereby causing wind noise and vibration. Therefore, it is preferred that the structure in which the lamp body 33 and the outward protruding piece 41 are integrated with each other is employed.

The rear-side extending surface 42 has substantially fan-like shape extending to a place behind the rear end 332 from a side (a portion provided to be continuous with a rear end of the outward protruding piece 41) of the lamp body 33 on the vehicle-width-direction outer side in a top view (FIG. 8). In other words, the rear-side extending surface 42 is a surface obtained by extending a surface for guiding the traveling air, which is formed by the outward protruding piece 41 extending toward the vehicle-width-direction outer side, toward the vehicle-width-direction inner side and the rear side of the vehicle V. A surface that is continuous with the rear-side extending surface 42 on the front side thereof is a surface that supports a lower end surface of the outer light 31 illustrated in FIG. 5B.

The inner-side extending surface 43 is a surface obtained by further extending a surface extending toward the rear side of the rear end 332 of the lamp body 33, which is formed by the rear-side extending surface 42, toward the vehicle-width-direction inner side. The inner-side extending surface 43 has a shape, which extends diagonally upward and of which front-rear width gradually decreases (see FIG. 8) from the outer side toward the inner side in the vehicle width direction.

A recessed portion 5 shaped as if being cut toward the vehicle-width-direction inner side is included on a lower portion of the rear lamp 3 by disposing the cylindrical lamp body 33 close to the extending surface 4 having the shape described above. The recessed portion 5 is partitioned by the extending surface 4 and a side surface (outer peripheral surface) of the lamp body 33, and extends downward on the vehicle-width-direction inner side toward a lower surface of the lamp body 33 from a side surface of the lamp body 33 on the vehicle-width-direction outer side.

In more detail, with reference to FIGS. 5A and 5B, the recessed portion 5 is partitioned by a lower curved portion 334 of the cylindrical-shaped portion 33R, and the guide surface 412 and the rear-side extending surface 42 of the extending surface 4. The lower curved portion 334 is a portion below the position in the cylindrical-shaped portion 33R protruding toward the most outer side. As illustrated in FIG. 6, while the guide surface 412 and the rear-side extending surface 42 are roughly horizontal surfaces, the lamp body 33 has a cylindrical outer peripheral surface. Therefore, the recessed portion 5 forms a space of which an up-down width becomes narrower as the space approaches the vehicle-width-direction inner side from the vehicle-width-direction outer side.

[About Trailing Vortex]

Figure 9:
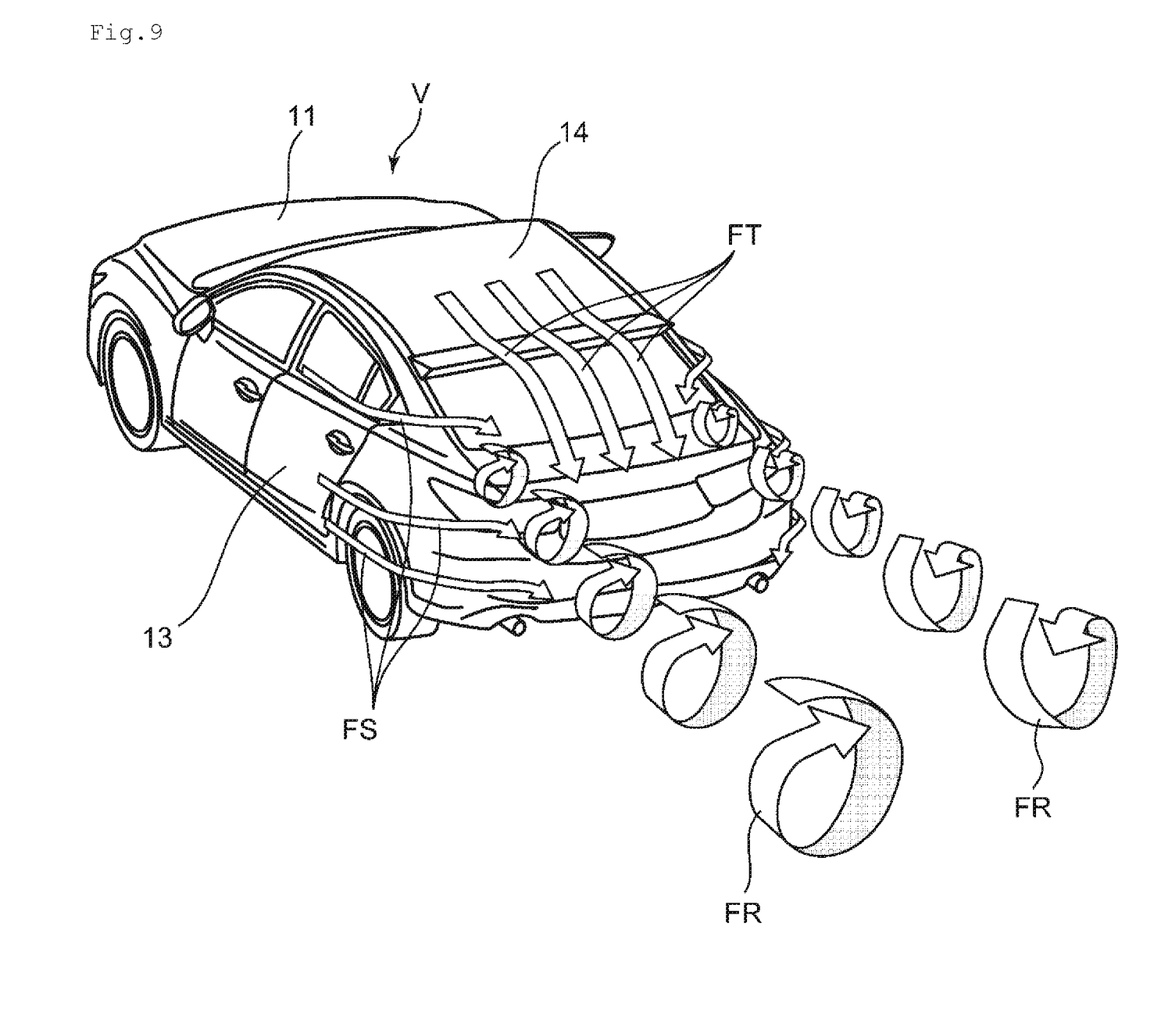
FIG. 9 is a schematic diagram for describing trailing vortices.

In this embodiment, the extending surface 4 described above is provided on the rear surface 12 of the vehicle V in order to prevent a trailing vortex of which size is large from being generated when the vehicle V travels. With reference to FIG. 9, the trailing vortex is described. When the vehicle V travels, side surface airflows FS flowing along the side surfaces 13 and roof airflows FT flowing along the top surface 14 are generated. The side surface airflows FS and the roof airflows FT flow into a rear-side region of the vehicle V.

In the rear-side region of the vehicle V, trailing vortices FR are formed when the side surface airflows FS are drawn into the roof airflows FT. The trailing vortices FR are a pair of left and right vortices flowing in a spiral manner while expanding the diameters thereof from the rear end of the vehicle V toward the rear side. A region interposed between the pair of trailing vortices FR is a negative pressure region (dead water region) in which air hardly flows. Therefore, the region generates a kinetic energy loss by causing a drag for moving the vehicle V to the rear side to act on the vehicle V. In other words, the trailing vortices FR apply a traveling resistance to the vehicle V. As the trailing vortices FR become larger and stronger, the traveling resistance applied to the vehicle V becomes larger. Therefore, it is vital to cause the trailing vortex F to be as small (week) as possible.

The vehicle V of this embodiment includes, on the rear end and the upper end of the lower side surface 13B, the cylindrical lamp bodies 33 extending in the front-rear direction and the extending surfaces 4 extending from the vehicle-width-direction outer sides of the lamp body 33 toward the inner sides. The recessed portions 5 shaped as if being cut toward the vehicle-width-direction inner side are formed below the rear lamps 3. By the structural features as above, the side surface airflows FS actively go around to the rear surface 12, and the generation of the large-sized trailing vortices FR is suppressed.

Figure 10:
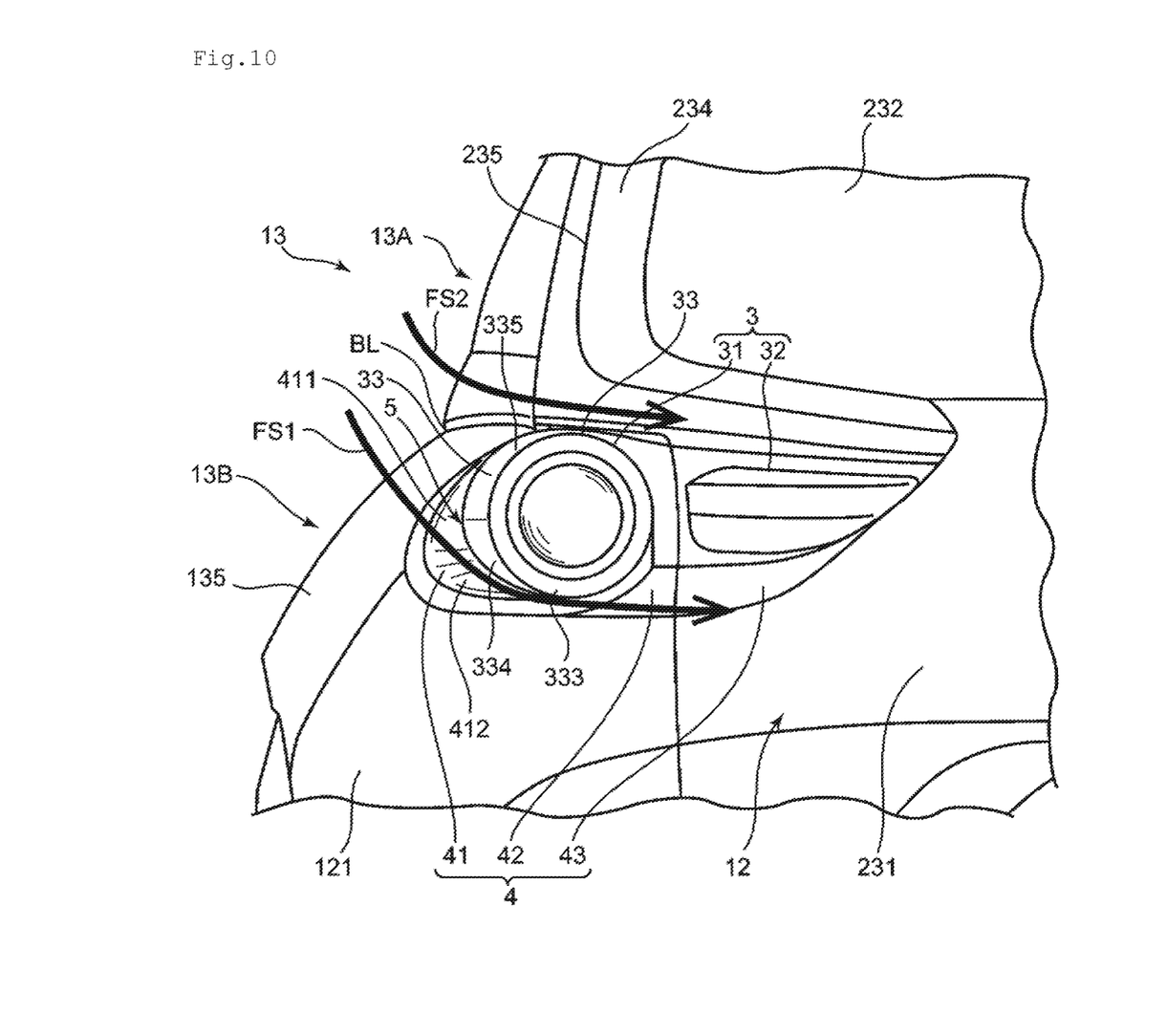
FIG. 10 is a view obtained by adding the inflow of side surface airflows toward the vehicle-width-direction inner side to the rear view of FIG. 6.

FIG. 10 is a view obtained by adding the inflow of the side surface airflows FS toward the vehicle-width-direction inner side to the rear view in FIG. 6. A side surface airflow FS1 flowing along the lower side surface 13B bulging out to a place on the outer side of the lamp body 33 enters a place below the lamp body 33 so as to be along the extending surface 4 (outward protruding piece 41) at a place around the rear surface 12. Then, the side surface airflow FS1 is directed toward the vehicle-width-direction inner side on the vehicle rear side through the extending surface 4 (the rear-side extending surface 42 and the inner-side extending surface 43). In other words, the side surface airflow FS1 flows into the vehicle-width-direction inner side in such a manner that the side surface airflow FS1 enters a cut in the recessed portion 5 partitioned by the lower curved portion 334 and the guide surface 412 and is guided by the rear-side extending surface 42 and the inner-side extending surface 43.

In particular, the side surface of the lamp body 33 on the vehicle-width-direction outer side is formed by the cylindrical-shaped portion 33R extending in the front-rear direction. Therefore, on the side surface of the lamp body 33 on the vehicle-width-direction outer side, a portion (an outermost portion of the cylindrical-shaped portion 33R) protruding toward the vehicle-width-direction outer side and a portion (lower end 333) recessed toward the inner side are exhibited in the vehicle height direction. Therefore, a section in which the lamp body 33 is disposed is a section that easily directs the side surface airflow FS1 toward the vehicle-width-direction inner side.

The cylindrical-shaped portion 33R includes an upper curved portion 335 on the upper portion, and hence has a portion recessed toward the inner side also formed above the rear lamp 3. The lamp body 33 is disposed on the extended line c of the beltline BL (FIG. 4). Therefore, a side surface airflow FS2 that flows along a place around the beltline BL and the upper side surface 13A is also guided by the upper curved portion 335, and easily flows into the vehicle-width-direction inner side.

In this embodiment, the vehicle width switches from the lower side surface 13B of which width is relatively wide to the upper side surface 13A of which width is narrow at the beltline BL serving as a border. The cylindrical lamp body 33 is disposed on the rear end and the upper end of the lower side surface 13B serving as a vehicle-width switching portion from a wide width to a narrow width. Shape features as above also cause the side surface airflow FS2 to easily enter the vehicle-width-direction inner side also above the rear lamp 3. The rear side garnish 234 having a ridgeline 235 protruding toward the rear side also helps guiding the side surface airflow FS2 toward the vehicle-width-direction inner side. A lower end portion of the rear side garnish 234 enters the vehicle-width-direction inner side on the upper side of the rear lamp 3. The lower end portion having the ridgeline 235 forms a slightly protruding shape and provides a shape that causes the side surface airflow FS2 to easily enter the inner side.

[Effect of Suppressing Trailing Vortices]

Figure 11A:
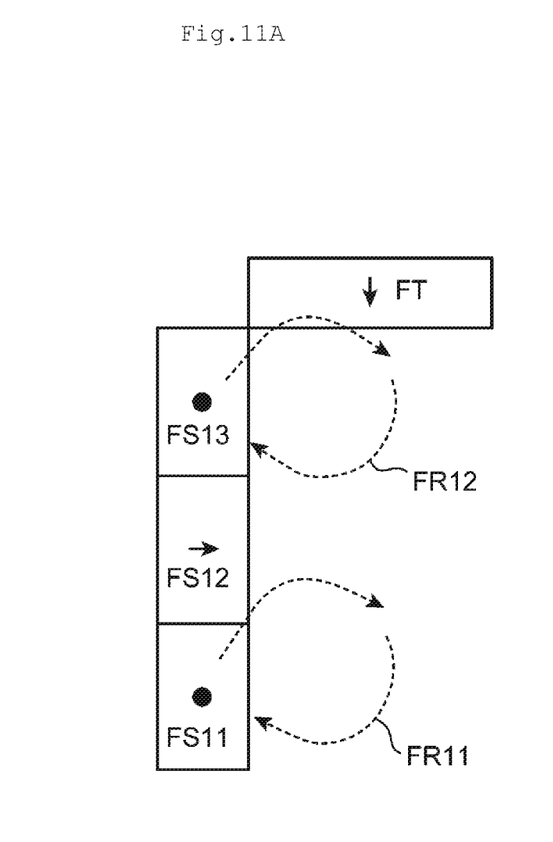
FIG. 11A and FIG. 11B illustrate the generation situation of trailing vortices in a vehicle structure of a comparative example.
Figure 11B:
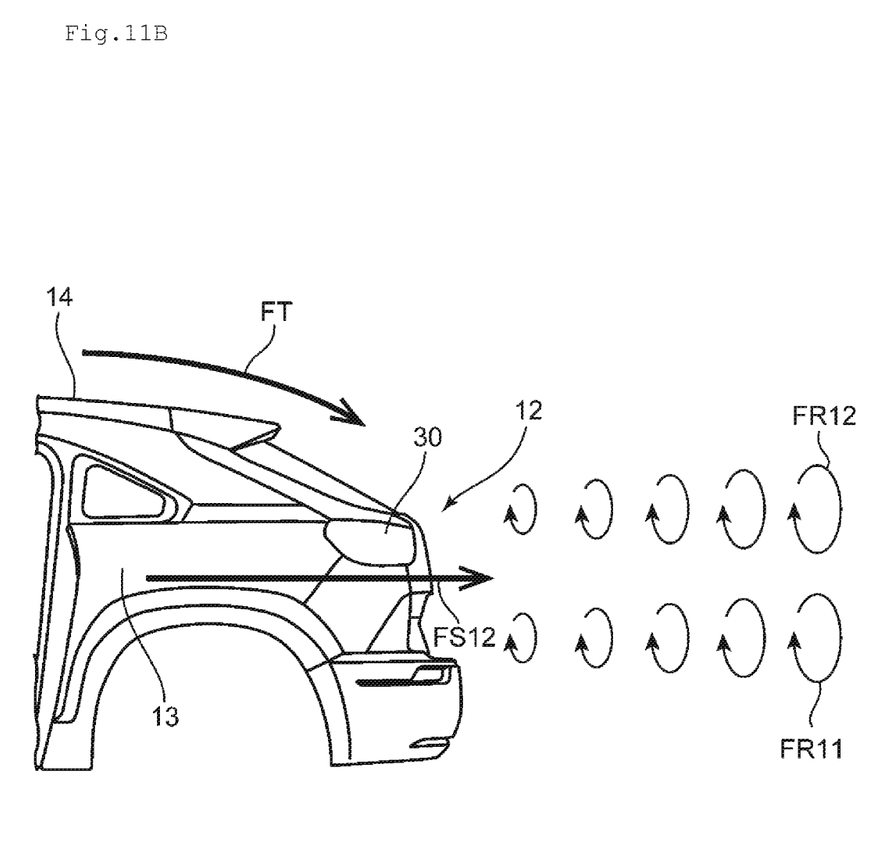

An effect of suppressing the trailing vortices FR by the extending surfaces 4 is described with reference to FIGS. 11A and 11B and FIGS. 12A and 12B. FIGS. 11A and 11B illustrate the generation situation of the trailing vortices in a vehicle structure of a comparative example that does not include the extending surfaces 4. FIG. 11A illustrates the generation situation of the side surface airflows FS, the roof airflows FT, and the trailing vortices FR when the vehicle is seen in a rear view, and FIG. 11B illustrates the generation situation when the vehicle is seen in a side view.

When the extending surfaces 4 are not provided on the rear surface 12, the side surface airflows FS are not actively directed toward the vehicle-width-direction inner side and heads toward the vehicle-width-direction inner side in a relatively gradual manner. In order to express this state, FIG. 11A illustrates a state in which, out of three side surface airflows FS11, FS12, and FS13 that are vertically arranged, the side surface airflows FS11 and FS13 progress to the rear side in a straight manner and only the side surface airflow FS12 enters the vehicle-width-direction inner side in a gradual manner.

The side surface airflows FS11 and FS13 form trailing vortices FR11 and FR12 by being drawn into the roof airflows FT or by being affected by other airflows including the side surface airflow FS12. The vortex directions of the trailing vortices FR11 and FR12 are clockwise directions as illustrated in FIG. 11A because a vector in which the roof airflows FT fall into the space on the vehicle rear side and a vector in which the side surface airflows FS11 and FS13 enter the space on the vehicle rear side while heading toward the rear side function. Now, the inflow of the side surface airflow FS12 toward the vehicle-width-direction inner side is slow, and hence the growth of the trailing vortices FR11 and FR12 is not inhibited. Therefore, the large-sized trailing vortices FR11 and FR12 are formed on the upper side and the lower side of the vehicle V. In the comparative example as above, the traveling resistance of the vehicle V increases by the large-sized trailing vortices FR11 and FR12.

Figure 12A:
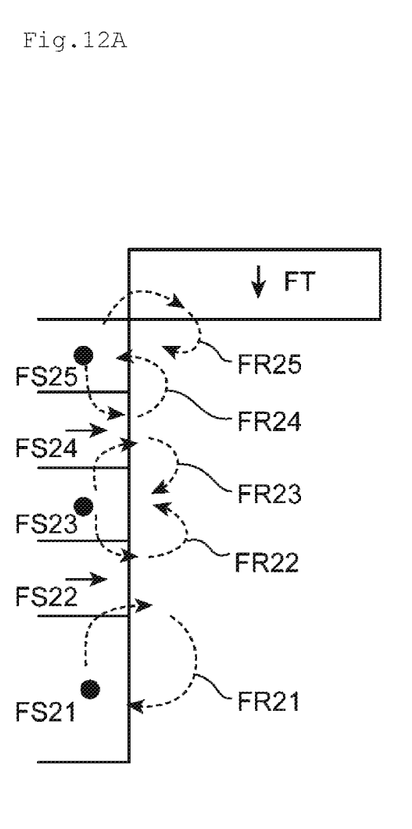
FIG. 12A and FIG. 12B illustrate the generation situation of the trailing vortices in the vehicle structure of this embodiment.
Figure 12B:
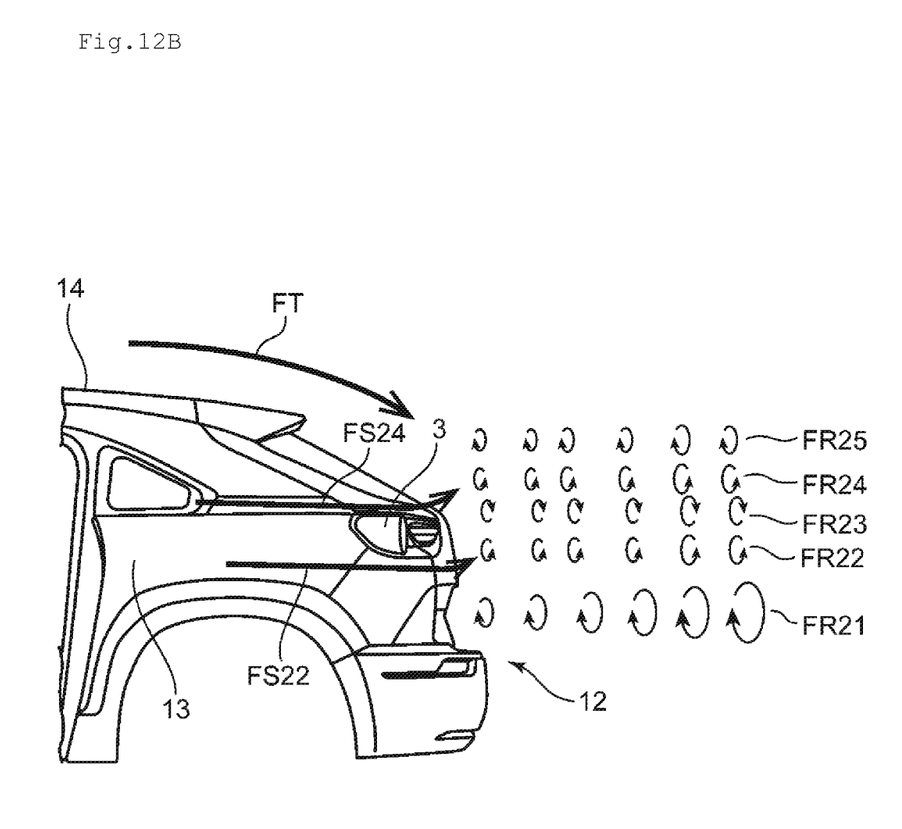

Meanwhile, FIGS. 12A and 12B illustrate the generation situation of the trailing vortices in the vehicle structure of this embodiment including the extending surfaces 4. FIG. 12A illustrates the generation situation of the side surface airflows FS, the roof airflows FT, and the trailing vortices FR when the vehicle is seen in a rear view, and FIG. 12B illustrates the generation situation of the above when the vehicle is seen in a side view.

By providing the extending surfaces 4 on the rear surface 12, the side surface airflows FS are actively directed toward the vehicle-width-direction inner side and guided toward the vehicle-width-direction inner side. In this embodiment, as described with reference to FIG. 10 above, the side surface airflow FS1 is guided toward the inner side by the extending surface 4 on the lower side of the rear lamp 3, and the side surface airflow FS2 is also guided toward the inner side on the upper side of the rear lamp 3. In order to express this state, FIG. 12A illustrates a state in which, out of five side surface airflows FS21, FS22, FS23, FS24, and FS25 that are vertically arranged, the side surface airflows FS21, FS23 and FS25 progress to the rear side in a straight manner while the side surface airflows FS22 and FS24 relatively abruptly enter the vehicle-width-direction inner side. The side surface airflows FS22 and FS24 correspond to the side surface airflows FS1 and FS2 illustrated in FIG. 10.

The trailing vortex may be generated by the side surface airflows FS21, FS23 and FS25. However, the generation of a large and strong trailing vortex is inhibited by the side surface airflows FS22 and FS24 flowing into the vehicle-width-direction inner side. As illustrated in FIG. 12A, by using the inflow of the side surface airflow FS22 toward the inner side as an opportunity, a clockwise trailing vortex FR21 due to the side surface airflow FS21 is generated below the side surface airflow FS22 and a counterclockwise trailing vortex FR22 due to the side surface airflow FS23 is generated above the side surface airflow FS22. By using the inflow of the side surface airflow FS24 toward the inner side as an opportunity, a clockwise trailing vortex FR23 due to the side surface airflow FS23 is generated below the side surface airflow FS24 and a counterclockwise trailing vortex FR24 due to the side surface airflow FS25 is generated above the side surface airflow FS24. By drawing a part of the side surface airflow FS25 into the roof airflows FT, a clockwise trailing vortex FR25 is generated.

As a result, according to the vehicle structure of this embodiment, only the trailing vortices FR21 to FR25 that are subdivided in a manner greater than that of the comparative example are generated. In other words, a large trailing vortex that increases the traveling resistance of the vehicle V is not generated. Even when the entering of the side surface airflow FS24 based on the upper curved portion 335 of the lamp body 33 is weak, the subdivision effect of the trailing vortex is exhibited by the side surface airflow FS22 actively directed toward the vehicle-width-direction inner side at the extending surface 4 (recessed portion 5). In other words, the extending surface 4 (outward protruding piece 41) of this embodiment has a surface shape expanding toward the vehicle-width-direction outer side and extending downward in a direction heading toward the rear end 332 side from the front end 331 side of the lamp body 33. This is because a larger amount of the side surface airflow can be taken into the extending surface 4 from the vehicle-width-direction outer side of the lamp body 33 and caused to enter the vehicle-width-direction inner side by the above.

In this embodiment, the lower side surface 13B is a portion that bulges toward the vehicle-width-direction outer side with respect to the rear lamp 3 at the front side of a height position overlapping with the rear lamp 3. Therefore, the side surface airflows (FS23, FS24, and FS25 in FIG. 12A) flowing along the lower side surface 13B tend to not easily head toward the vehicle-width-direction inner side. However, the extending surface 4 (recessed portion 5) is included behind the lower side surface 13B and at a height position at which the side surface airflow FS22 flows, and hence an effect of directing the side surface airflow FS22 toward the vehicle-width-direction inner side and cutting apart the trailing vortex can be realized.

[Modifications]

The embodiment of the present disclosure has been described above, but the present disclosure is not limited thereto and can be carried out in various modified embodiments.

(1) In the abovementioned embodiment, an example in which the basic shape of the lamp body 33 is a cylindrical shape and the cylindrical-shaped portion 33R is included on the vehicle-width-direction outer side is described. The lamp body 33 may have a shape other than a cylindrical shape as long as the lamp body 33 has a shape that extends in the vehicle front-rear direction. For example, the lamp body 33 may have a square-tube-like shape.

(2) In the abovementioned embodiment, an example in which the extending surface 4 includes the rear-side extending surface 42 and the inner-side extending surface 43 in addition to the outward protruding piece 41 protruding toward the vehicle-width-direction outer side with respect to the lamp body 33 is described. The form of the extending surface 4 is not limited as long as a portion that triggers the side surface airflow to enter the vehicle-width-direction inner side can be provided on the rear surface 12 of the vehicle. For example, the rear-side extending surface 42 and the inner-side extending surface 43 may be omitted and the extending surface 4 only including the outward protruding piece 41 or an outward protruding surface corresponding to the outward protruding piece 41 formed at the body of the vehicle body may be used.

(3) In the abovementioned embodiment, an example in which the side surface 13 in which the vehicle width switches from the upper side surface 13A having a narrow width to the lower side surface 13B having a wide width at the beltline BL serving as a border is included and the rear lamp 3 is disposed on the rear side and the upper end of the lower side surface 13B is described. The configuration has an advantage in that the side surface airflow easily enters the vehicle-width-direction inner side also on the upper surface side of the rear lamp 3. Instead of the above, the side surface 13 in which the vehicle width is not switched by a great degree in the height direction may be used. In this case, the extending surface 4 that forms a recessed-shaped portion (recessed portion 5) having a shape of being cut toward the vehicle-width-direction inner side only needs to be provided on the lower surface side of the rear lamp 3.

What is claimed is:

1. A vehicle structure, comprising:
a rear lamp, disposed on a rear end and a side end of a vehicle, and including a lamp body extending in a front-rear direction of the vehicle;
a vehicle side surface including a portion bulging toward a vehicle-width-direction outer side with respect to the rear lamp at a front side of a height position overlapping with the rear lamp; and
a vehicle rear surface including an extending surface extending toward the vehicle-width-direction outer side with respect to the lamp body in a top view of the vehicle from a lower portion of the rear lamp; wherein
the vehicle side surface includes an upper side surface above a beltline of the vehicle and a lower side surface below the beltline, and the lower side surface has a wider width than the upper side surface;
the beltline is a line disposed on the vehicle side surface extending in the vehicle front-rear direction at lower ends of one or more side windows of the vehicle;
the rear lamp is disposed on a rear end and an upper end of the lower side surface;
the lamp body is disposed on an extended line of the beltline in a plan view seen from a place above the vehicle; and
the lamp body is disposed on the extended line of the beltline in a side view of the vehicle.

2. The vehicle structure according to claim 1, further comprising:
a recessed portion provided on a lower portion of the rear lamp, partitioned by the extending surface and a side surface of the lamp body, and extending downward on a vehicle-width-direction inner side toward a lower surface of the lamp body from a side surface of the lamp body on the vehicle-width-direction outer side.

3. The vehicle structure according to claim 2, wherein
a side surface of the lamp body on the vehicle-width-direction outer side is configured by a cylindrical-shaped portion extending in the front-rear direction of the vehicle.

4. The vehicle structure according to claim 3, wherein
the extending surface has a surface shape that expands toward the vehicle-width-direction outer side and extends downward in a direction heading toward a rear-end side from a front-end side of the lamp body.

5. The vehicle structure according to claim 4, wherein
the extending surface extends to a place behind a rear end portion of the lamp body from a side of the lamp body on the vehicle-width-direction outer side.

6. The vehicle structure according to claim 3, wherein
the extending surface has a surface shape that expands toward the vehicle-width-direction outer side and extends downward in a direction heading toward a rear-end side from a front-end side of the lamp body.

7. The vehicle structure according to claim 6, wherein
the extending surface extends to a place behind a rear end portion of the lamp body from a side of the lamp body on the vehicle-width-direction outer side.

8. The vehicle structure according to claim 2, wherein
a side surface of the lamp body on the vehicle-width-direction outer side is configured by a cylindrical-shaped portion extending in the front-rear direction of the vehicle;
the extending surface includes, at a place below the lamp body, a guide surface extending toward the vehicle-width-direction outer side from a lower end portion of the cylindrical-shaped portion; and
the recessed portion is partitioned by a lower curved portion of the cylindrical-shaped portion and the guide surface of the extending surface.

9. The vehicle structure according to claim 8, wherein
the extending surface has a surface shape that expands toward the vehicle-width-direction outer side and extends downward in a direction heading toward a rear-end side from a front-end side of the lamp body.

10. The vehicle structure according to claim 9, wherein
the extending surface extends to a place behind a rear end portion of the lamp body from a side of the lamp body on the vehicle-width-direction outer side.

11. The vehicle structure according to claim 1, wherein
a side surface of the lamp body on the vehicle-width-direction outer side is configured by a cylindrical-shaped portion extending in the front-rear direction of the vehicle.

12. The vehicle structure according to claim 1, wherein
the extending surface has a surface shape that expands toward the vehicle-width-direction outer side and extends downward in a direction heading toward a rear-end side from a front-end side of the lamp body.

\* \* \* \* \*